United States Patent [19]

Jähn et al.

[11] Patent Number: 4,753,374
[45] Date of Patent: Jun. 28, 1988

[54] METERING APPARATUS

[75] Inventors: Peter Jähn, Leverkusen; Klaus Kriesner, Langenfeld; Gerhard Marzolph, Cologne, all of Fed. Rep. of Germany

[73] Assignee: Bayer Aktiengesellschaft, Leverkusen, Fed. Rep. of Germany

[21] Appl. No.: 833,319

[22] Filed: Feb. 24, 1986

Related U.S. Application Data

[63] Continuation of Ser. No. 556,523, Nov. 30, 1983, abandoned.

[30] Foreign Application Priority Data

Dec. 20, 1982 [DE] Fed. Rep. of Germany ..... 82111794

[51] Int. Cl.⁴ .................................. G01F 13/00
[52] U.S. Cl. ................................................. 222/414
[58] Field of Search ........ 222/342, 220, 216, 222-223, 222/225, 414, 410

[56] References Cited

U.S. PATENT DOCUMENTS

| 25,382 | 9/1859 | Burrows | 222/414 |
| 95,149 | 9/1869 | Schopp | 222/414 X |
| 504,718 | 9/1893 | Franke | 222/414 X |
| 2,440,846 | 5/1948 | Cannon | 222/222 X |
| 3,486,484 | 12/1969 | Bullough | 222/414 X |
| 3,534,787 | 10/1970 | Heck | 222/414 X |
| 3,606,099 | 9/1971 | Benson | 222/342 X |
| 3,633,331 | 1/1972 | Reichlin | 222/414 X |
| 4,227,835 | 10/1980 | Nussbaum | 406/52 |
| 4,316,559 | 2/1982 | McLemore | 222/225 |

FOREIGN PATENT DOCUMENTS

| 108562 | 2/1900 | Fed. Rep. of Germany | 222/414 |
| 52-61058 | 5/1977 | Japan | 222/414 |

*Primary Examiner*—Charles A. Marmor
*Attorney, Agent, or Firm*—Sprung Horn Kramer & Woods

[57] ABSTRACT

A metering apparatus includes a roller charging device having an encircling groove which allows an accurate metering in minimum quantities, using the respective angle of slope of a pourable loose material.

8 Claims, 2 Drawing Sheets

METERING APPARATUS

This is a continuation of application Ser. No. 556,523, filed 11/30/83, now abandoned.

BACKGROUND OF THE INVENTION

This invention relates to a metering apparatus, in particular for fine metering, for slope-forming loose materials, consisting of a housing provided with a charge and discharge opening, in which housing a rotor with a groove is positioned.

In various chemical processes, pourable materials often have to be added continuously. In such an operation, particular difficulties are presented by minimal quantities, as they have to be supplied, for example, in laboratory experiments.

A roller metering hopper is known, in which the material being conveyed is drawn off from the feed funnel in grooves which are arranged parallel to the axis, in order to then freely fall out below after being conveyed along the housing wall.

The disadvantage of this apparatus is that a continuous discharge is impossible, because at the moment when the groove leaves the surrounded housing, this groove immediately runs completely empty. An evening-out of the metering operation may indeed be achieved by increasing the throughput, which is then generally no longer suitable for laboratory experiments because of the quantity. Moreover, a forced cleaning of the grooves is difficult technically, so that the roller metering hopper is of hardly any use for products which adhere thereto. Furthermore, the parallel edges of the grooves and opening produce an undesirable abrasion, and one can usually count on a blockage of the metering apparatus as a result of the product becoming wedged in.

SUMMARY OF THE INVENTION

An object of the present invention is to provide a product-sparing metering apparatus which allows a continuous addition of loose materials with a high metering accuracy, in particular in the case of minimal quantities.

This object is achieved according to the present invention in that at least one groove is positioned along the circumference of the rotor.

As a result of the groove in accordance with the present invention, the cross-sectnal dimensions of which amount to at least one times the maximum particle diameter, it is possible to continuously add a pourable loose material in a pre-determined quantity, and the rotating rotor ensures that no blockages occur, and thus no irregularities take place in the supply. Moreover, the conveyance may be influenced, depending on the position of additionally corresponding frictional forces due to corresponding direction pre-settings of the encircling groove to the vertical plane. The apparatus has a simple, compact construction which facilitates maintenance and a change of conveyed material.

In one specific embodiment, there is provided on the metering path a corresponding fictitious tangent between the edge directly opposite the groove in the region of inlet or outlet of the loose material in the housing, and a lowest point of the cross section of the groove at an angle to the horizontal which is smaller than the angle of repose of slope (natural) from respective loose material.

If the acute angle of the line, which lies in the plane through the circumference of the groove foot on the rotor and the inside edge of the housing opening, is smaller than the slope or flow angle of the loose material inside the groove to be metered, said groove may indeed be filled, but a shooting-through action of the loose material is no longer possible. In this case, the desired metering quantity still only depends on the groove volume and on the speed of the rotor. Consequently, the metering error, in particular during the addition of minimal quantities, is very small. At the same time, the loose material is treated sparingly.

In one particular embodiment, the product-charged construction parts have varying coefficients of friction.

On account of, for example rough entraining surfaces in the groove and smooth sliding surfaces in the housing, the loose material is passed to the discharge point without a substantial change to the structure, as a result of which, the metering accuracy is increased and abrasion on the housing is reduced.

In another embodiment, the groove cross section has a predetermined shape.

Due to the shape of the groove, the conveyed volume may be predetermined while simultaneously changing the entraining surface. For example, a triangular groove is suitable for small quantities, and a rectangular groove is suitable for larger quantities. In the case of an irregular grain diameter of the loose material, a groove which has a semicircular cross section is to be preferred.

In another embodiment, a metering device is positioned upstream of the groove.

With a metering device which may consist of, for example a loosener (stirring apparatus) or a condenser (roller wheel), it is possible to avoid a bridge formation, and to introduce the loose material into a groove with a regular density, so that the metering accuracy is increased even further.

In one embodiment, a stripping device is positioned at the discharge point.

By means of the stripper, it is possible to clean the groove thoroughly during each rotation, even in the case of loose material which sticks on, so that a high metering accuracy is achieved.

One example of the present invention is shown in the drawings and will now be described in the following.

DETAILED DESCRIPTION OF THE INVENTION

Figure 1:
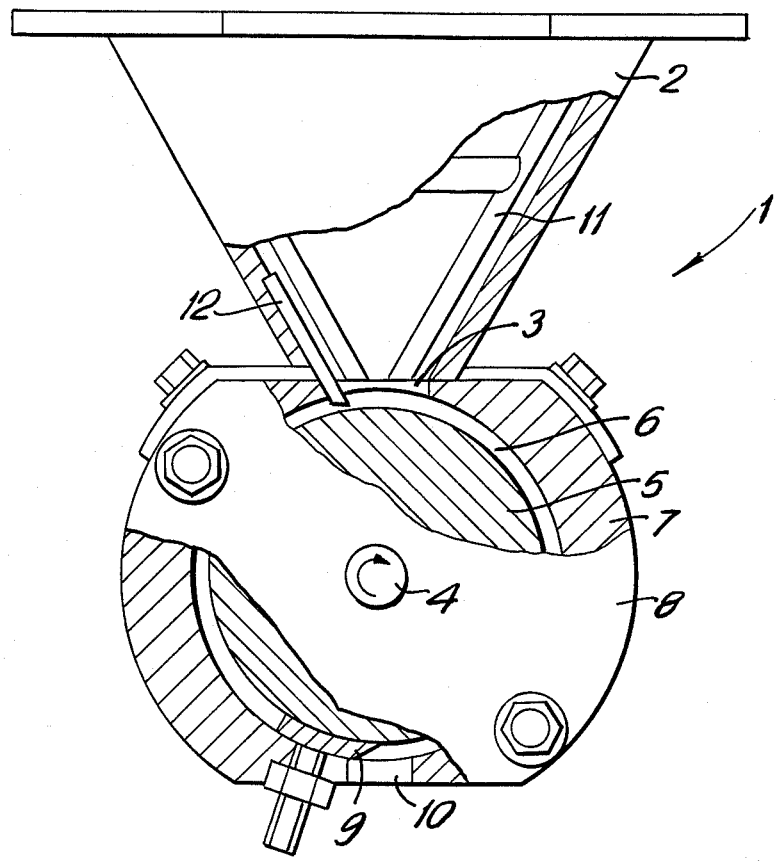
FIG. 1 shows a cross section through a roller.
Figure 2:
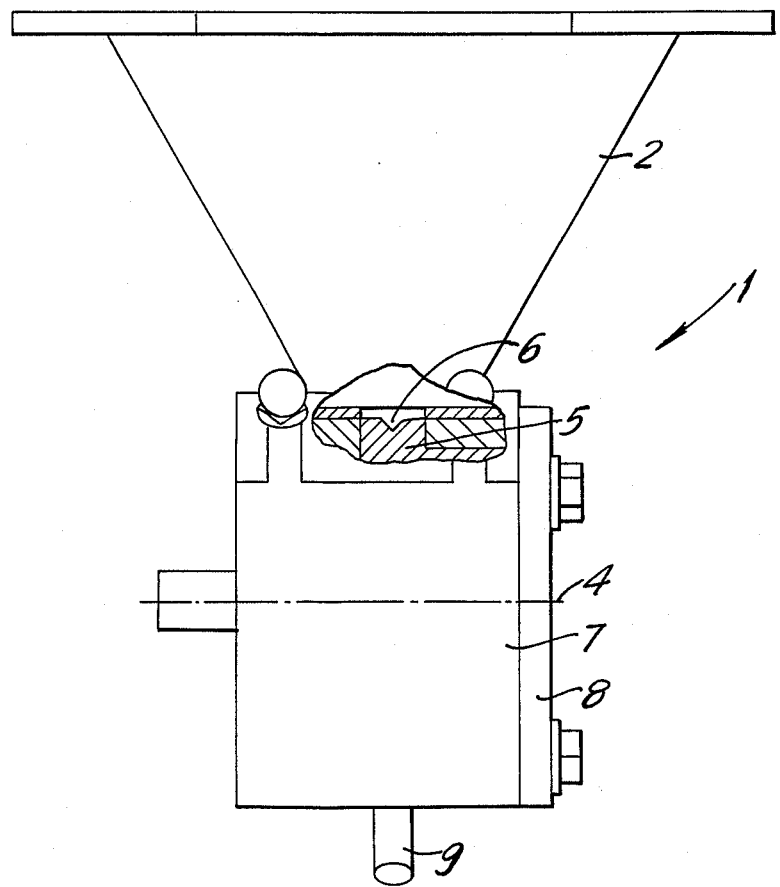
FIG. 2 shows a longitudinal section through the roller.

FIGS. 1 and 2 show a metering apparatus 1, in which a feed funnel 2 is positioned with its charging opening 3 over a rotor 5 which rotates about an axis 4. The rotor 5 has a groove 6 and is positioned in a housing 7. Furthermore, the section shows part of a cover 8 and a stripper 9 in a discharge opening 10. A stirrer as a metering device 11, and a partition 12 are also shown in the funnel 2. The rotor 5 and the metering device 11 are driven by motors which are not shown.

Loose material is charged into feed funnel 2. This material then trickles automatically through the charging opening 3 along an encircling groove of the rotor 5, with the formation of a constant slope, possibly with an evening-out of the supply by a metering device 11. The geometric dimensions are calculated such that the out-flow of the material terminates upstream of the point in the groove 6 from where the material would overcome the frictional forces as a result of gravity due to a standing-back incline. During the continued transport, the loose material is then continuously entrained due to rotation of the rotor 5, and an accurately metered quantity is conveyed as a result of the speed and the filling of the groove 6 until this quantity finally falls downwards automatically through the discharge opening 10. Any residues which remain are removed from the groove 6 by a stripper 9.

The metering apparatus is appropriately constructed using those materials which have the necessary hardness and corrosion resistance with respect to the loose material to be conveyed. It may be judicious to produce the rotor or the product-charged parts thereof from a different material to that of the housing, or of the product-charged parts thereof.

EXAMPLES

Three metering apparatus having the following dimensions were produced according to FIGS. 1 and 2:

| Metering apparatus | Housing Material | Rotor Material | Outside diameter | Shape | Groove Width | Depth |
|---|---|---|---|---|---|---|
| No. 1 | 1.4571 | PTFE/GF | 40 mm | Triangle | 2 mm | 1 mm |
| No. 2 | 1.4571 | PTFE/GP | 60 mm | Triangle | 6 mm | 3 mm |
| No. 3 | 1.4571 | 1.4571 | 60 mm | Trapezium | above 20 mm below 15 mm | 4.8 mm |

The following products were metered using these three metering apparatus:

| Example | Metering apparatus | Product | Apparent density g/cm$^3$ | Grain diameter mm | Roller speed 1/min. | Metered quantity g/h | Volume efficiency C |
|---|---|---|---|---|---|---|---|
| 1 | No. 1 | sodium sulphate anhydrous | 1.4 | <0.20 | 0.7 | 3 | 0.40 |
| 2 | No. 2 | Oxalic acid | 0.69 | <1 | 32 | 1670 | 0.78 |
| 3 | No. 3 | Sodium hexametaphosphate | 1.09 | <0.25 | 17 | 14580 | 0.90 |

We claim:

1. In a metering apparatus for the fine metering of slope-forming loose materials, having a housing with a charge and a discharge opening, and a grooved rotor rotatably mounted in the housing about an axis of rotation, the improvement wherein: at least one groove is positioned along the circumference of the rotor, wherein said at least one groove is continuous and has a V-shaped cross section converging to a base point, wherein the charge opening has a leading edge with respect to the direction of rotation of the rotor which is directly opposite the groove and wherein the leading edge terminates vertically above the groove and horizontally offset in the direction of rotation from a vertical plane including the axis of rotation, wherein the discharge opening has a trailing edge with respect to the direction of rotation and which is directly opposite the groove and which terminates vertically below the groove and horizontally offset from the vertical plane including the axis of rotation opposite to the direction of rotation and wherein a corresponding fictitious tangent between the leading edge or the trailing edge and a base point of the cross section of the grooves has an angle to the horizontal which is smaller than the angle of repose of the loose material.

2. A metering apparatus according to claim 1, wherein the rotor and housing have different coefficients of friction.

3. A metering apparatus according to claim 1, wherein the at least one groove cross section has a constant shape.

4. A metering apparatus according to claim 1, further comprising a metering device positioned upstream of the at least one groove.

5. A metering apparatus according to claim 1, further comprising a stripper positioned at the discharge opening.

6. The apparatus according to claim 1, wherein the discharge opening is disposed at the lowest point of the rotor.

7. A method of metering slope-forming loose material comprising: providing a rotor rotating in a housing about an axis of rotation and with a continuous V-shaped cross-section groove which converges to a base point in the circumference thereof; feeding the material by gravity into a housing charge opening having a leading edge with respect to the direction of rotation of the rotor which is directly opposite the groove and terminates vertically above the groove and is horizontally offset in the direction of rotation from a vertical plane including the axis of rotation; entraining the material from the charge opening in the continuous groove in the circumference of the rotating rotor; and metering the entrained material to a discharge outlet in the housing having a trailing edge with respect to the direction of rotation and which is directly opposite the groove and which terminates vertically below the groove and horizontally offset from the vertical plane including the axis of rotation opposite to the direction of rotation in dependence on only the groove volume and the rotor speed by providing that a corresponding fictitious tangent between the leading edge or the trailing edge and a base point of the cross section of the groove has an angle to the horizontal which is smaller than the angle of repose of the loose material.

8. The method according to claim 7, wherein the step of metering comprises discharging the material at the lowest point of the rotor.

* * * * *

UNITED STATES PATENT AND TRADEMARK OFFICE
CERTIFICATE OF CORRECTION

PATENT NO. : 4,753,374

DATED : June 28, 1988

INVENTOR(S) : Peter Jähn, et al

It is certified that error appears in the above-identified patent and that said Letters Patent is hereby corrected as shown below:

Title Page under "Foreign Priority Data"    Delete "Fed. Rep. of Germany" and substitute --Europe--

Signed and Sealed this

Seventh Day of February, 1989

Attest:

DONALD J. QUIGG

Attesting Officer    Commissioner of Patents and Trademarks